A. R. GIBBONS.
MEASURING DEVICE.
APPLICATION FILED OCT. 6, 1916.
1,234,009.
Patented July 17, 1917.
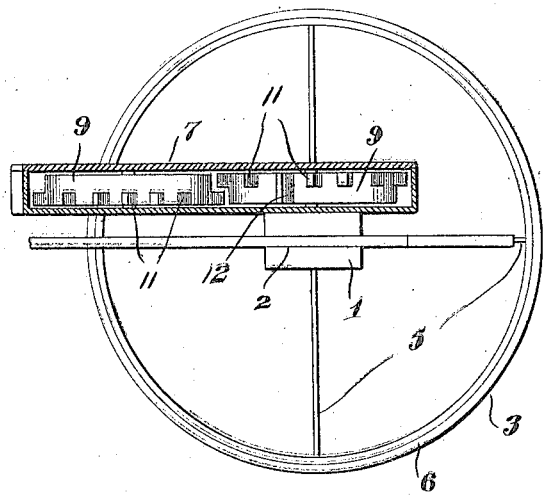
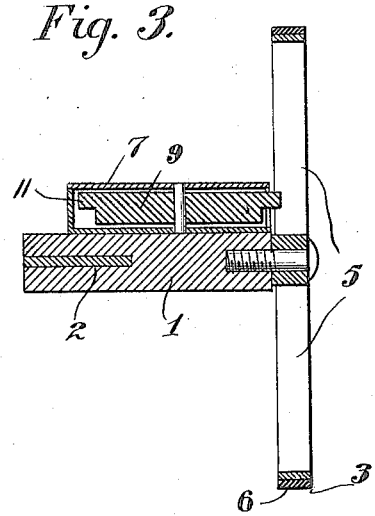
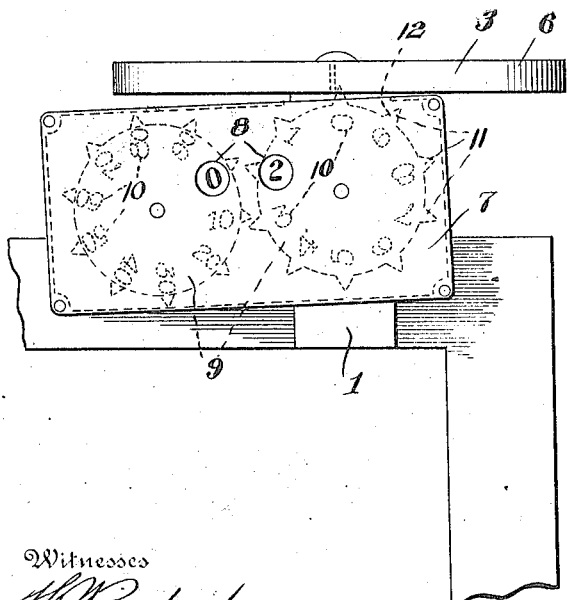
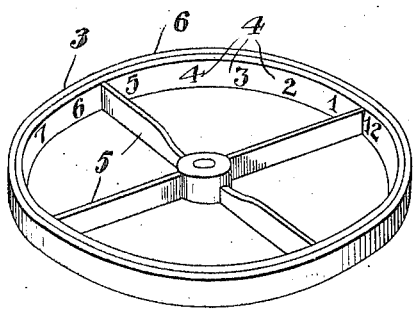
Inventor
A. R. Gibbons.
Witnesses
By Victor J. Evans
Attorney

UNITED STATES PATENT OFFICE.

ARTHUR R. GIBBONS, OF EDDYVILLE, NEBRASKA.

MEASURING DEVICE.

1,234,009.   Specification of Letters Patent.   Patented July 17, 1917.

Application filed October 6, 1916. Serial No. 124,129.

*To all whom it may concern:*

Be it known that I, ARTHUR R. GIBBONS, a citizen of the United States, residing at Eddyville, in the county of Dawson and State of Nebraska, have invented new and useful Improvements in Measuring Devices, of which the following is a specification.

This invention relates to measuring devices and it consists in the novel features hereinafter described and claimed.

An object of the invention is to provide a measuring device of simple and durable structure especially adapted to be used for measuring lengths whether the said lengths be in straight or curved lines.

With this object in view the device includes a block adapted to be applied to a square, handle or other suitable support and having a counter mounted thereon. A wheel is journaled upon the block and some of the spokes of the wheel are engageable with teeth provided upon the initial disk of the counter whereby the counter is actuated as the wheel is rolled over a line. The wheel is provided at the inner surface of its rim with a series of graduations indicating inches and the disks of the counter are provided with figures to be observed through openings provided in the casing of the counter and each time that the wheel is passed along the line for a distance of twelve inches the spokes encounter the teeth of the initial disk of the counter whereby the counter is actuated and one foot is registered. Several counters may be employed one indicating units, another tens and if desired other counters indicating hundreds and thousands may be used. When ten feet have been registered upon the initial disk the second disk is turned to indicate that number.

Figure 1 is a side elevation of the device with parts in section.

Fig. 2 is a plan view of the same;

Fig. 3 is a sectional view of the same;

Fig. 4 is a perspective view of a wheel used on the same.

The measuring device comprises a block 1 provided with a slit 2 adapted to receive a portion of a square or a handle whereby the same is mounted in a support. A wheel 3 is journaled upon the block 1 and the said wheel is provided at the inner surface of its rim with suitable numbers 4. The said numbers are arranged in sets from one to twelve and two sets of numbers are provided. The wheel 3 is provided with spokes two of which are broader transversely than the others. The broader spokes are joined with the rim of the wheel at the ends of the series of numbers. A rubber tire 6 is applied to the rim of the wheel 3. A casing 7 is mounted upon the block 1, and is provided with sight openings 8. Disks 9 are mounted for rotation in the casing 7 and the said disks are provided with numbers 10 and the said numbers are adapted to be brought into register with the openings 8 as the said disks rotate. The said disks are provided at their peripheries with teeth 11 and one tooth on the initial disk is provided with a laterally disposed lug 12. The said lug is located in that tooth which is adjacent the number nine. The teeth upon the initial disk are adapted to be encountered by the broader spokes upon the wheel 3 and the teeth on the other disk are beyond the path of movement of the spokes of the said wheel. The teeth on the disk which is adjacent the initial disk lie in the path of movement of the lug on the tooth of the initial disk which is provided with the same.

In operation, the block 1 is applied to a square or handle and the wheel 3 is rolled along the line which is to be measured. It is obvious that this line may be straight, curved, or angular. When the rotation of the wheel 3 causes the broader spokes to strike the teeth of the initial disk, the initial disk is rotated step by step and at each step of the rotation a number thereon is brought to view through one of the openings 8 of the counter casing 7. As the number nine upon the initial disk is brought into registration with the opening 8 the lug upon the adjacent tooth engages one of the teeth of the next adjacent disk whereby the said disk is rotated one step. When the next broader spoke of the wheel 3 encounters one of the teeth upon the initial disk the next disk is turned so that the number ten is brought to view through one of the openings 8.

It is obvious that in applying the device of the kind described to a support, tanks may be measured inside or out, hay stacks may be measured at their circumferences, straight lines may be measured upon boards or other objects and the device for applying to a square is devoid of obstruction which interferes with the operation of the square for usual purposes.

Having declared the invention what is claimed is:

A measuring device comprising a block, a wheel journaled on the block and having spokes, a counter casing mounted on the block and having openings, disks journaled in the counter casing and having numbers adapted to be brought to view through the said openings, said disks also having peripherally located teeth, the teeth of one disk being disposed in the path of movement of the spokes of the wheel and one tooth upon the said disk being prolonged laterally to engage successively the teeth of the next adjacent disk whereby the last mentioned disk is rotated at intervals.

In testimony whereof I affix my signature.

ARTHUR R. GIBBONS.

Copies of this patent may be obtained for five cents each, by addressing the "Commissioner of Patents, Washington, D. C."